No. 751,540. Patented February 9, 1904.

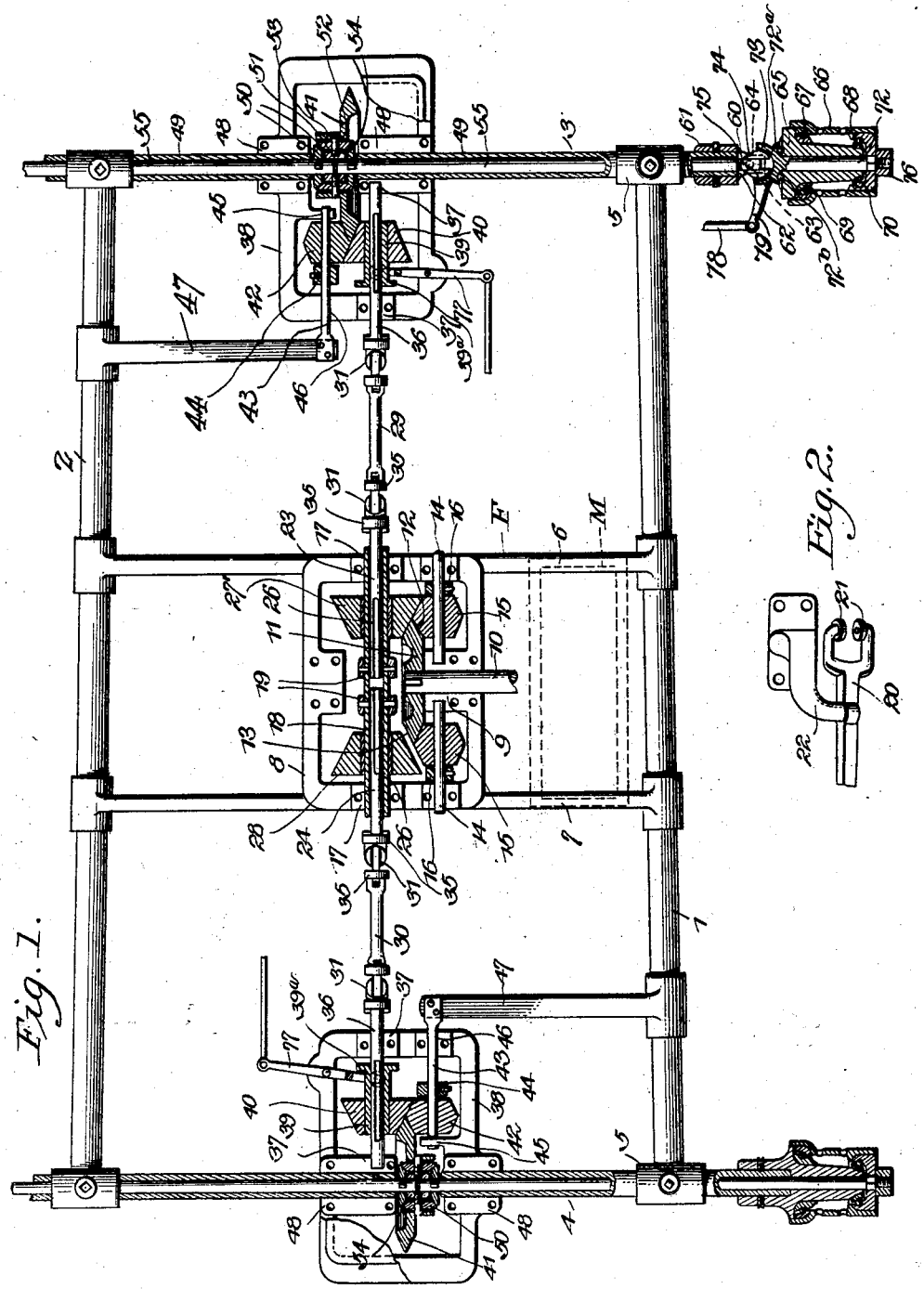

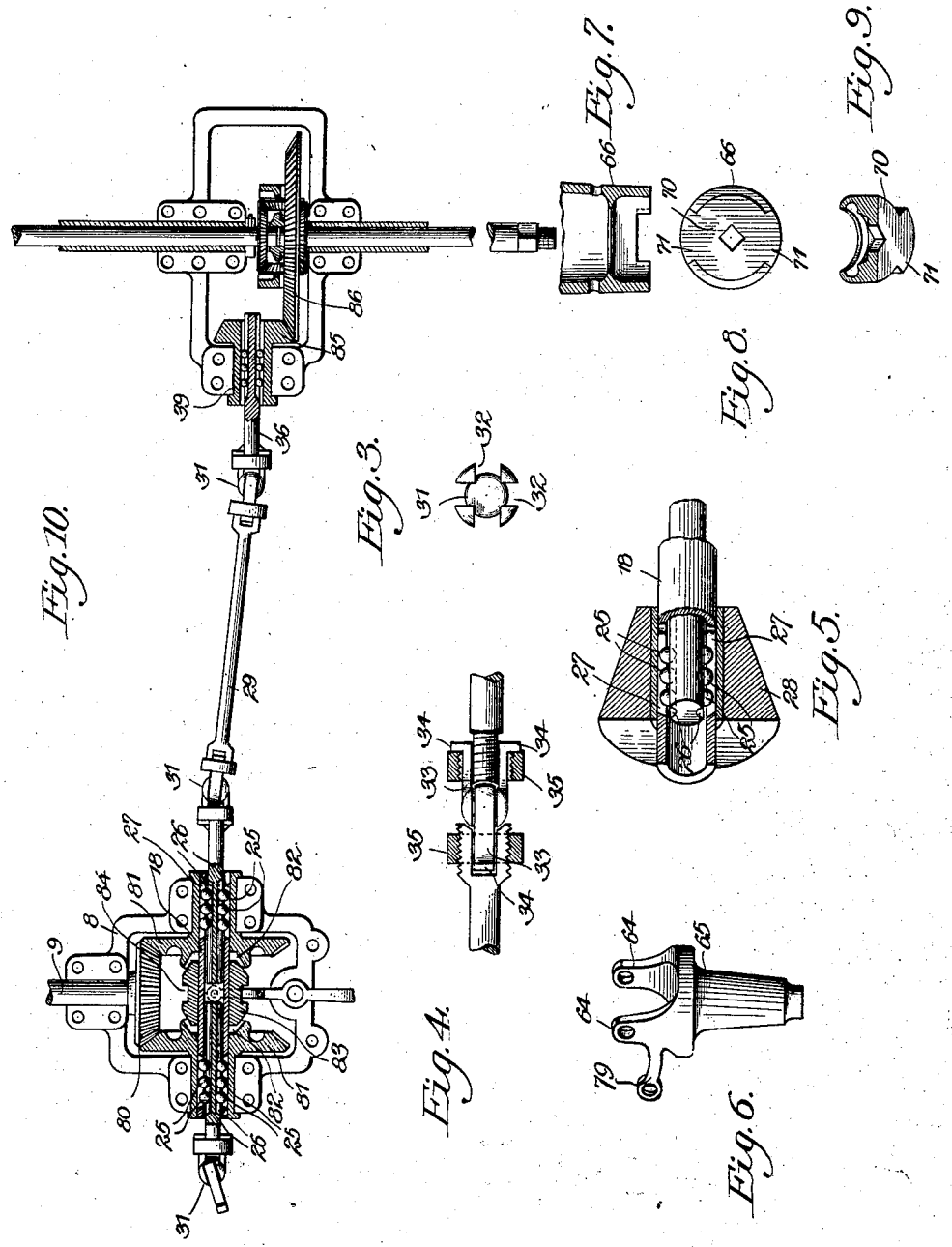

UNITED STATES PATENT OFFICE.

DAVID L. McCLINTOCK, OF KANSAS CITY, MISSOURI.

POWER-TRANSMITTING MECHANISM.

SPECIFICATION forming part of Letters Patent No. 751,540, dated February 9, 1904.

Application filed April 27, 1903. Serial No. 154,503. (No model.)

*To all whom it may concern:*

Be it known that I, DAVID L. MCCLINTOCK, a citizen of the United States, residing at Kansas City, in the county of Jackson and State of Missouri, have invented a new and useful Power - Transmitting Mechanism for Motor-Vehicles, of which the following is a specification.

This invention relates to power-transmitting mechanism for motor-vehicles, and more especially to that form of power-transmitting mechanism in which power is transmitted from a motor centrally placed to all the wheels of the vehicle.

The object of the invention is to provide improved means for transmitting power from the motor to the wheels of the vehicle, in which are combined simplicity of construction, durability in service, a diminution of friction between the working parts, and consequently more effective and economical application of power in propelling the vehicle.

A further object of the invention is to provide mechanism for transmitting power to the wheels of a motor-vehicle in which all wear of the working parts may be readily taken up by suitable adjustments, thus preventing rattling and lost motion.

With the objects above stated and others which will appear as the invention is better understood the same consists in the construction and combination of parts hereinafter described, illustrated in the accompanying drawings, and having the novel features thereof particularly pointed out in the appended claims.

In the drawings, Figure 1 is a view in plan of the supporting-frame of an automobile, some parts being broken away, with my improved power-transmitting mechanism shown in horizontal section in association with said frame. Fig. 2 is a detail view showing the lever for controlling the direction of motion of the vehicle and its supporting-bracket. Fig. 3 is a view of one of the balls used in the ball-and-socket joints of the power-transmitting mechanism. Fig. 4 is a detail view in section of one of the ball-and-socket joints. Fig. 5 is a detail view in section, showing the mode of connecting the gear-supporting sleeves and the power-transmission shaft. Fig. 6 is a detail view in perspective of one of the wheel-supporting sections of the front axle. Fig. 7 is a detail view in section of a portion of one of the hubs. Fig. 8 is a detail view from the end of one of the hubs and the cone associated therewith. Fig. 9 is a detail sectional perspective view of the cone shown in Fig. 8. Fig. 10 is a detail view of a modified form of a power-transmitting mechanism, showing the essential differences from the preferred form of the mechanism.

In all the views of the drawings corresponding parts are designated by the same characters of reference.

Referring to the drawings in detail, F designates generally the supporting-frame of a motor-vehicle, comprising side bars 1 and 2 and sleeves 3 and 4, secured to the side bars by means of clamps 5.

6 and 7 are transverse bars in the frame, which stiffen the frame laterally. The motor is diagramatically indicated at M, and 8 is a casting for supporting the central portion of the power-transmitting mechanism, the motor and casting being suspended from the body of the vehicle.

In the preferred form of embodiment of the invention (illustrated in Fig. 1) the casting 8 is provided at 9 with bearings for the shaft 10, driven by the motor M, and having rigidly secured to its end a friction driving-gear 11, the periphery of which presents two outwardly-converging inclined surfaces 12 and 13. On one side of the gear 11 are mounted rigidly upon the casting 8 two counter-shafts 14, each having rotatably and slidably mounted thereon a double cone 15, the movement of which upon its counter-shaft is limited by a set-collar 16. On the side of the friction-gear 11 opposite the cones 15 is mounted in bearings 17 a sleeve 18, provided near the middle with two rigidly-attached collars 19, spaced apart, as shown, to permit the entrance therebetween of the forked ends of a lever 20, provided with antifriction-rolls 21 and supported upon a bracket 22 at the side of the casting 8. The sleeve 18 is slidably connected with the adjacent ends of shafts 23 and 24 and is keyed to said shafts by means of a series of antifriction-balls 25, located in grooves 26 in said shaft and projecting into the slots 27 in the sleeve 18, as best shown in Fig. 5.

Rigidly secured upon the sleeve 18 at suitable distances apart are two reversely-disposed conical friction-gears 27 and 28, so placed that either may be brought into frictional engagement with the friction-surface 13 of friction-gear 11. The friction-cones 27 and 28 are of such size that when either is brought into engagement with the friction-surface 13 of the friction-gear 11 a portion of the inclined surface engages with one of the double cones 15, as shown in Fig. 1, causing said double cone to slide along its shaft 14 and engage frictionally with the friction-surface 12 of friction-gear 11. By this construction, as will be readily seen, the pressure of either of said frictional cones 27 and 28 upon the gear 11 will be balanced by the pressure produced simultaneously by one of the double cones 15, thus preventing any distortion of the friction-gear 11 by lateral pressure thereon from either of the friction-cones 27 28.

The shafts 23 and 24 are each connected at their distal ends by universal joints to shafts leading to the gearing mounted upon the axles of the vehicle. The shaft 23 is connected with a shaft 29 and the shaft 24 with a shaft 30. The form of connection used in each instance comprises, preferably, a ball 31, provided with two annular grooves 32, disposed at right angles to each other, as shown, and a pair of U-shaped yokes 33, disposed in the grooves 32 on the ball 31 and provided at their open ends with laterally-projecting lugs 34. The side portions of the yokes 33 lie in grooves provided in the sides of the shafts and are held in position there by means of threaded collars 35, which engage threads cut upon the shafts and abut against the lugs 34, provided at the open ends of the yokes 33. By means of this construction perfect freedom of movement between the shafts connected thereby is secured at all times, and by means of the threaded collars and the lugs 34 provision is made for taking up all wear upon the balls 31 and the yokes 33.

The shaft 29 is connected at its forward end by means of a universal joint such as described in the preceding paragraph with a short shaft 36, which is mounted for rotation in bearings 37 upon a casting 38 on the front axle of the vehicle. Slidably mounted on shaft 36 is a sleeve 39, to which the shaft 36 is connected, preferably, by means of antifriction-balls (not shown) in the manner in which the sleeve 18 is keyed to shafts 23 and 24, as above explained. The sleeve 39 has rigidly mounted thereon a friction-cone 40, which is arranged in relation to a friction-gear 41, and a double cone 42 in the manner already explained in connection with the friction-gear 11, cones 27 and 28, and the double cones 15. The double cone 42 is mounted on a counter-shaft 43, so as to slide and rotate freely thereon, being limited as to its movement by means of a set-collar 44. The shaft 43 is secured to the casting 38 at 45 and 46 and is connected at its end which projects beyond the casting to a bracket 47, which projects from one of the side bars of the vehicle-frame and serves to support in part the casting 38. The friction-gear 41 is mounted between pairs of clamping-plates 48, by means of which the casting 38 is attached to adjacent sections of the front axle 49 and has a hub sufficiently large for compensating gearing (designated generally by 50) to be mounted therein, as shown. The compensating gearing comprises bevel-gears 51, mounted on gudgeons 52, which extend through a flange 53, which projects laterally from the friction-gear 41 on one side thereof and in a collar 54, which encircles loosely the adjacent end portions of front-wheel-driving shafts 55. The gears 51 mesh with gears 56, which are rigidly secured to the adjacent end portions of the driving-shafts 55. The entire compensating gearing is covered by the flange 53, which besides forming a cover for the compensating gearing provides a suitable surface for the operation of a friction-brake of any preferred form. (Not shown.)

At the distal ends of the front axle 3 are rigidly attached forked brackets 60, each comprising a collar 61, which is secured to the axle 3, and arms 62, to which are secured by means of gudgeons 63 the forked arms 64 of the axle-skein 65, upon which is mounted the hub 66 of one of the front wheels.

In order to reduce the friction between the hub and the axle-skein to a minimum, I preferably provide hollow bearings between said skein and said hub, the preferred form of bearing being that indicated in the drawings and comprising ball-races 67 and 68 at the inner and outer ends of the skein, respectively, and a ball-race 69 and cone 70 at the inner and outer ends of the hub, respectively. The ball-races and cone may be secured in position in any desired manner; but the cone is preferably formed with projecting wings 71, which engage the recesses provided therefor in the outer end of the hub.

In order to transmit motion from the driving-shaft 55 to the hubs 66 and at the same time prevent any interference with the pivotal movement of the skein on the axle, shafts 55 are connected with spindles 72, rotatably mounted in skeins 65, by means of universal joints somewhat similar to those described in a preceding paragraph. At the inner end of each of the spindles 72 is provided a fork having arms 73, which engage with an annular groove on a ball 74, and at the outer end of each of shafts 55 is provided a similar fork 75, which engages with a groove on said ball 74 at right angles to the firts-mentioned groove. The spindles 72 are preferably connected with cones 70 by having a portion of each spindle near its outer end squared and fitted into a squared socket in said cone, a nut 76 being provided at the outer extremity of each spindle beyond the cone 70 to hold the spindle and cone in proper relation.

In order to prevent longitudinal movement of the spindles within the axle-skein and keep the shaft-sections 55 in proper relation to each other, each of the spindles is provided near the joint connecting it with its shaft-section 55 with a flange 72$^a$, which is provided on the surface adjacent to the axle-skein with a groove forming a race for a series of antifriction-balls 72$^b$, which form a thrust-bearing between said flange and said axle-skein and effectively prevent outward longitudinal movement of the spindle in the axle-skein.

In order to adjust the degree of pressure between the cone 40 and friction-gearing 41, the forked lever 77 may be pivotally mounted in an opening provided therefor in bearing 38, the forked ends of the lever lying between the cone 40 and a collar 39$^a$ upon the sleeve 39, as shown.

The mechanism already described forms all that is necessary to transmit motion from the motor M to the front wheels of the vehicle and includes provision for the shifting of said wheels with reference to the axle in order to steer the vehicle. The steering is accomplished by means of levers (not shown) and connecting-rods 78, pivotally attached to arms 79, mounted on or cast integral with the axle-skeins 65.

The mechanism for transmitting power to the rear wheels of the vehicle is very similar to that employed in driving the front wheels, the chief differences lying in the connection of the axle-skein to the rear axle 4 and the connection of the driving-shaft to the cone secured to each of the rear-wheel hubs at its outer end. As it is undesirable to have the rear wheels shiftable in position relative to the rear axles, the driving-shaft for each rear wheel is directly connected to the cone in the rear hub driven from said shaft, and the universally jointed spindle employed in connection with each of the front wheels is done away with, and as the skein for each of the rear wheels need not have any motion relative to the rear axle it is secured rigidly thereon. With these differences of construction excepted the mechanism for driving the rear wheels is precisely the same as that employed in driving the front wheels. Consequently detailed description thereof is deemed unnecessary, and the same characters of reference used to designate corresponding portions of the mechanism for driving the front wheels are used to designate the parts of the mechanism for driving the rear wheels.

The levers 77, employed in adjusting the pressure between cones 40 and friction driving-gears 41, may, if desired, be connected with a centrally-placed lever (not shown) on the body of the vehicle, so that both of said levers may be simultaneously operated.

In the embodiment of my invention illustrated in Fig. 10 I mount in the central casting 8 a bevel-gear 80, which is attached to the shaft 9 of the motor and is constantly in mesh with a pair of oppositely-placed bevel-gears 81, loosely mounted on the sleeve 18 and provided on their opposite faces with conical clutch-faces 82, and for the collars 19 I substitute a double friction-cone 83, having a circumferential groove 84 for the engagement of the forked ends of the operating-lever. The friction-cone 83 is rigidly mounted on the sleeve 18, so that by shifting the friction-cone 83 the sleeve 18 may be locked into engagement with either of the bevel-gears 81, and consequently caused to rotate in either direction.

The shaft 36 in the modified form of the invention carries a sleeve 39; but instead of the cone 40 there is substituted a bevel-gear 85, which is kept at all times in mesh with a bevel-gear 86, which is substituted for the friction driving-gear 41, and the levers 77 for adjusting the pressure between the power-transmitting members are of course done away with.

In both forms of embodiment of the invention the power from the shaft 13 of the motor may be employed to drive the vehicle forward by setting the sleeve 18 in one position and rearward by setting the sleeve 18 in the opposite direction, and the vehicle may be allowed to remain at rest by placing the sleeve 18 in intermediate position, so that there is no driving connection between the sleeve and the shaft 9.

The other features of operation of the various parts of my invention have been explained in the preceding paragraphs, in which the construction of the various parts of the mechanism are described, thus rendering further statement of the operation at this point unnecessary.

While I have shown and described only two forms of embodiment of my invention, it is obvious that various changes may be made therein by substituting well-recognized equivalents for certain of the elements of the invention, which changes do not depart from the spirit of the invention and do not sacrifice any of the advantages thereof. I therefore wish it understood that I reserve the right to make such changes in the form, proportions, and mode of arrangement of the elements disclosed as do not depart from the spirit of the invention and lie within the scope of the appended claims.

Having thus described the construction and operation of my invention, what I claim as new, and desire to secure by Letters Patent, is—

1. In power-transmitting mechanism for motor-vehicles the combination with a supporting-frame, of front and rear axles, wheels carried by said axles, a driving-shaft, gearing associated with said driving-shaft and said axles, a flexible shaft connecting the gearing associated with said driving-shaft and said axles, and keys consisting of a plurality of balls disposed between said flexible shaft and said gearing.

2. The combination in power-transmitting mechanism for motor-vehicles of a supporting-frame, front and rear axles, wheels carried on said axles, a driving-shaft, gearing associated with said driving-shaft and said axles, a flexible shaft connecting said gearing associated with said driving-shaft and said axles, grooves provided in said flexible shaft, balls mounted in said grooves and engaging with suitable portions of said gearing to permit sliding movement of said gearing on said shaft and preventing rotative movement of said gearing on said shaft.

3. The combination in power-transmitting mechanism for motor-vehicles of a supporting-frame, front and rear axles, wheels on said axles, a driving-shaft, gearing associated with said driving-shaft, gearing associated with said wheels, a connecting-shaft associated with said last-mentioned gearing, and means for imparting motion from the first-mentioned gearing to said connecting-shaft, said means comprising a sleeve slidably mounted on said connecting-shaft and at either end a power-transmitting member adapted to engage with the first-mentioned gearing.

4. The combination in power-transmitting mechanism for motor-vehicles of a supporting-frame, front and rear axles, wheels carried on said axles, a driving-shaft, gearing associated with said driving-shaft, gearing associated with said wheels, a connecting-shaft associated with said last-mentioned gearing, said connecting-shaft being formed in front and rear sections spaced apart, and means for imparting motion from the gearing associated with said driving-shaft to said connecting-shaft, said means comprising a sleeve slidably mounted upon the adjacent end portions of the spaced sections of said driving-shaft and at either end a power-transmitting member adapted to engage with the gearing associated with said driving-shaft.

5. The combination in power-transmitting mechanism for motor-vehicles of a supporting-frame, front and rear axles, wheels carried on said axles, a driving-shaft, gearing associated with said driving-shaft, gearing associated with said wheels, a connecting-shaft formed in front and rear universally-jointed sections spaced apart at their adjacent ends, and a sleeve slidably mounted on the adjacent end portions of said sections and secured at either end a power-transmitting member adapted to engage with the gearing associated with said driving-shaft.

6. The combination in power-transmitting mechanism for motor-vehicles of a driving-shaft, a friction-gear mounted on said shaft and having two inclined outwardly-converging faces, a counter-shaft on one side of said friction-gear, a cone slidably mounted on said counter-shaft, a second counter-shaft on the opposite side of said friction-gear, and a double cone slidably mounted on said last-mentioned counter-shaft.

7. The combination in a driving mechanism for motor-vehicles of a driving-shaft, a friction-gear mounted on said shaft and having two inclined outwardly-converging operating-faces, a counter-shaft disposed at right angles to said driving-shaft, a pair of cones slidably mounted on said counter-shaft and adapted to engage one side of said friction-gear, a pair of alined counter-shafts parallel to the first-mentioned counter-shaft, and double cones mounted on said alined counter-shafts and adapted to engage with said gear and the cones on the first-mentioned counter-shaft.

In testimony that I claim the foregoing as my own I have hereto affixed my signature in the presence of two witnesses.

DAVID L. McCLINTOCK.

Witnesses:
C. E. HOYT,
JNO. S. MURPHY.